(12) United States Patent
Klingler

(10) Patent No.: US 9,303,532 B2
(45) Date of Patent: Apr. 5, 2016

(54) ADJUSTABLE GIB SHIM

(71) Applicant: General Electric Company, Schenectady, NY (US)

(72) Inventor: Brett Darrick Klingler, Greenville, SC (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 13/865,361

(22) Filed: Apr. 18, 2013

(65) Prior Publication Data

US 2014/0312199 A1   Oct. 23, 2014

(51) Int. Cl.

| | |
|---|---|
| *F16M 1/00* | (2006.01) |
| *F16M 3/00* | (2006.01) |
| *F16M 5/00* | (2006.01) |
| *F16M 7/00* | (2006.01) |
| *F16M 9/00* | (2006.01) |
| *F16M 11/00* | (2006.01) |
| *F01D 25/28* | (2006.01) |
| *A47F 5/00* | (2006.01) |
| *A47B 91/00* | (2006.01) |
| *A47G 29/00* | (2006.01) |
| *B65D 19/00* | (2006.01) |
| *F01D 25/24* | (2006.01) |
| *F03B 11/02* | (2006.01) |
| *F01D 25/26* | (2006.01) |
| *F03B 11/00* | (2006.01) |
| *F03D 11/04* | (2006.01) |
| *F04D 29/60* | (2006.01) |
| *F03B 1/00* | (2006.01) |
| *F03B 3/04* | (2006.01) |
| *F03D 1/04* | (2006.01) |
| *F04D 3/00* | (2006.01) |

(Continued)

(52) U.S. Cl.
CPC ............... *F01D 25/28* (2013.01); *F16M 7/00* (2013.01); *F01D 25/04* (2013.01); *F01D 25/243* (2013.01); *F05D 2230/642* (2013.01); *F05D 2230/644* (2013.01); *F05D 2250/292* (2013.01)

(58) Field of Classification Search
CPC ........ F01D 25/28; F01D 25/24; F01D 25/243; F16M 7/00; F03B 11/04; F03B 11/063; F03D 11/04
USPC ......... 248/200, 220.21, 231.9, 231.91, 274.1, 248/316.8, 346.06, 673, 188.4, 672; 415/126, 213.1, 220

See application file for complete search history.

(56) References Cited

U.S. PATENT DOCUMENTS 2,170,690 A * 8/1939 Mafera .................. 254/104
2,247,423 A * 7/1941 Webster, Jr. ............ 415/209.2

(Continued)

FOREIGN PATENT DOCUMENTS

EP    1894818 B1   5/2011

*Primary Examiner* — Syed A Islam
*Assistant Examiner* — Taylor Morris
(74) *Attorney, Agent, or Firm* — James W. Pemrick; Ernest G. Cusick; Frank A. Landgraff

(57) ABSTRACT

An article of manufacture includes a first member configured to be attached to a first support structure, a second member configured to be attached to the first member, and an externally threaded dowel configured to engage an internally threaded hole in the second member. The externally threaded member is also configured to contact the first member. Rotation of the externally threaded dowel adjusts a distance spanned by the first member and second member.

19 Claims, 5 Drawing Sheets

(51) Int. Cl.
*F04D 19/00* (2006.01)
*F04D 29/52* (2006.01)
*F01D 25/04* (2006.01)

(56) References Cited

U.S. PATENT DOCUMENTS

| | | | | |
|---|---|---|---|---|
| 2,709,571 | A | * | 5/1955 | Mafera .................. 254/104 |
| 3,556,672 | A | | 1/1971 | Gentile |
| 4,669,227 | A | * | 6/1987 | Treppner .................. 451/370 |
| 4,858,865 | A | * | 8/1989 | Schrepfer .................. 248/188.2 |
| 6,695,316 | B2 | * | 2/2004 | Popa et al. .................. 277/411 |
| 7,273,348 | B2 | | 9/2007 | Amirtharajah et al. |
| 7,328,879 | B1 | * | 2/2008 | Plangetis .................. 248/679 |
| 7,655,170 | B2 | | 2/2010 | Browne et al. |
| 7,717,395 | B2 | * | 5/2010 | Rowan et al. .................. 248/678 |
| 7,819,375 | B1 | * | 10/2010 | Johansen .................. 248/677 |
| 7,884,605 | B2 | | 2/2011 | Tamura et al. |
| 7,887,291 | B2 | | 2/2011 | Chevrette et al. |
| 7,905,465 | B1 | * | 3/2011 | Anwar .................. 248/673 |
| 7,987,637 | B2 | | 8/2011 | Smith |
| 8,047,779 | B2 | | 11/2011 | Roy et al. |
| 8,190,012 | B2 | | 5/2012 | Wetherell et al. |
| 2009/0044463 | A1 | | 2/2009 | Moscone et al. |
| 2010/0194009 | A1 | | 8/2010 | Fullwood et al. |
| 2011/0028061 | A1 | | 2/2011 | Sanderson et al. |
| 2011/0146053 | A1 | * | 6/2011 | Chevrette .................. 29/525.11 |
| 2011/0255959 | A1 | | 10/2011 | Klingler |
| 2011/0305566 | A1 | * | 12/2011 | Sankolli et al. .................. 415/209.2 |
| 2012/0235681 | A1 | | 9/2012 | Stemmer |
| 2012/0243976 | A1 | | 9/2012 | Ballard, Jr. et al. |
| 2013/0045097 | A1 | | 2/2013 | Kumar et al. |

* cited by examiner

ADJUSTABLE GIB SHIM

BACKGROUND OF THE INVENTION

The apparatus described herein relates generally to a gib shim. More specifically, the apparatus relates to an adjustable gib shim.

A gas turbine is mounted to its base by vertical supports at multiple locations. A forward support may be placed at the lower half vertical flange of the forward compressor casing, and two more supports may be placed on either side of the turbine shell. The forward support is a flexible plate that permits axial expansion of the turbine. The turbine shell supports are fixed and mounted to pads on each side of the base frame, and extend up to each side of the exhaust frame of the turbine shell. The turbine shell supports permit radial expansion, but control the axial and vertical position of the unit horizontal centerline to assure proper casing alignment.

Gib keys and blocks are used to prevent or limit lateral or rotational movement of the turbine casings while permitting axial and radial movement resulting from thermal expansion. A gib key may be machined on, or attached to, the lower half of the turbine shell. The gib key fits into a guide block which is welded to the turbine's base frame. In some applications, a specific gap between the gib key and block is desired. To obtain this gap the gib key must be machined until the desired gap is obtained. The machining operation is basically an iterative process that is typically repeated many times. For example, the gap is measured, the gib key is ground down and installed, the gap is re-measured and the process repeats until the desired gap is obtained. The gap may change based on various parameters, for example, shipping the turbine may require one gap, operation of the turbine may require a different length gap, and extended use of the turbine may require yet another gap. Measuring, machining and installing all these different gib keys is a time consuming and labor intensive process.

BRIEF DESCRIPTION OF THE INVENTION

In an aspect of the present invention, an article of manufacture includes a first member configured to be attached to a first support structure, a second member configured to be attached to the first member, and an externally threaded dowel configured to engage an internally threaded hole in the second member. The externally threaded member is also configured to contact the first member. Rotation of the externally threaded dowel adjusts a distance spanned by the first member and second member.

In another aspect of the present invention, an article of manufacture is configured for use with a turbomachine and includes a first member configured to be attached to a first support structure. The first member includes a first tapered surface. A second member is configured to be attached to the first member, and the second member includes a second tapered surface. An externally threaded dowel is configured to engage an internally threaded hole in the second member, and the externally threaded member is also configured to contact the first member. The first tapered surface is configured to cooperate with the second tapered surface, and rotation of the externally threaded dowel causes relative sliding movement between the first tapered surface and the second tapered surface to thereby adjust a gap between the second member and a second structure.

In yet another aspect of the present invention, a gib shim is configured for use with a turbomachine. The gib shim includes a first member configured to be attached to a first structure. The first member includes a first tapered surface. A second member is configured to be attached to the first member, and the second member includes a second tapered surface. An externally threaded dowel is configured to engage an internally threaded hole in the second member, and the externally threaded member is configured to contact the first member. The first tapered surface is configured to cooperate with the second tapered surface, and rotation of the externally threaded dowel causes relative sliding movement between the first tapered surface and the second tapered surface to thereby adjust a gap between the second member and a second structure.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
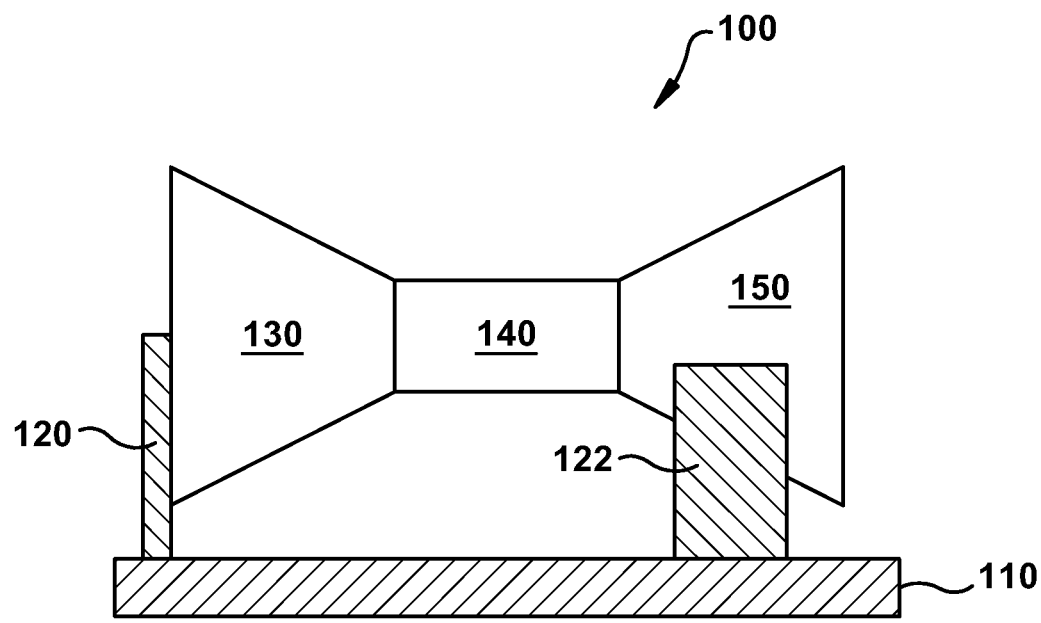
FIG. 1 illustrates a simplified schematic view of a turbomachine and its supporting structure.

FIG. 1 illustrates a simplified schematic view of a turbomachine 100 and its supporting structure. The turbomachine 100 may include gas turbines or steam turbines, or any other type of machinery requiring support. The turbomachine 100 in this example is a gas turbine, and the gas turbine includes a compressor section 130, combustor section 140 and turbine section 150. Support for the turbomachine 100 is provided by a compressor support 120 which may be placed at the lower half vertical flange of the forward compressor casing, and two turbine supports 122 (one is shown) may be placed on either side of the turbine shell. The compressor support 120 may be a flexible plate that permits axial expansion of the turbine. The turbine supports 122 are fixed and mounted to pads on each side of the base frame 110, and may extend up to each side of the exhaust frame of the turbine shell. The turbine supports 122 permit radial expansion, but control the axial and vertical position of the unit horizontal centerline to assure proper casing alignment.

Figure 2:
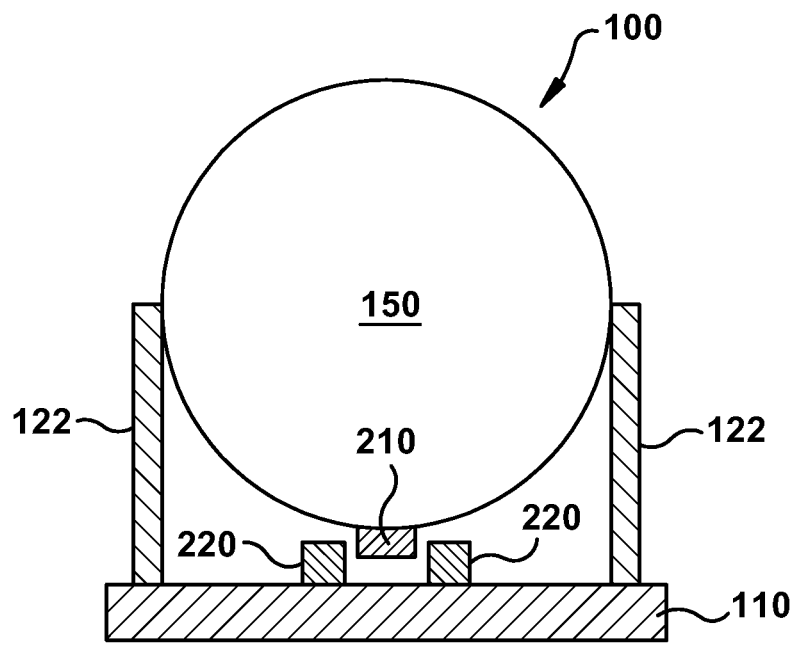
FIG. 2 illustrates a simplified turbine-end view of the turbomachine shown in FIG. 1.

FIG. 2 illustrates a simplified turbine-end view of the turbomachine 100 shown in FIG. 1. The turbine section 150 is supported by turbine supports 122 which extend down to the base frame 110. A gib key 210 and gib blocks 220 are used to prevent or limit lateral or rotational movement of the turbine casings while permitting axial and radial movement resulting from thermal expansion. The gib key 210 may be mounted to the turbine 150 exhaust casing (as shown) and may also be mounted on the compressor inlet case. The gib blocks 220 are mounted on the base frame 110. Gib keys 210 may also be machined on, or attached to, the lower half of the turbine shell, compressor inlet case or any other desired part of turbomachine 100. The gib key 210 fits between the two gib blocks 220 on the turbine's base frame. It can be seen that a gap exists between the gib key 210 and each of the gib blocks 220. This gap must be a specified value during various stages of turbomachine construction, testing, shipment and operation. Unfortunately, the specific gap length for these various stages of turbomachine life are different, and the desired gap can change based on additional factors even during each of the individual stages of the turbomachine's life.

Figure 3:
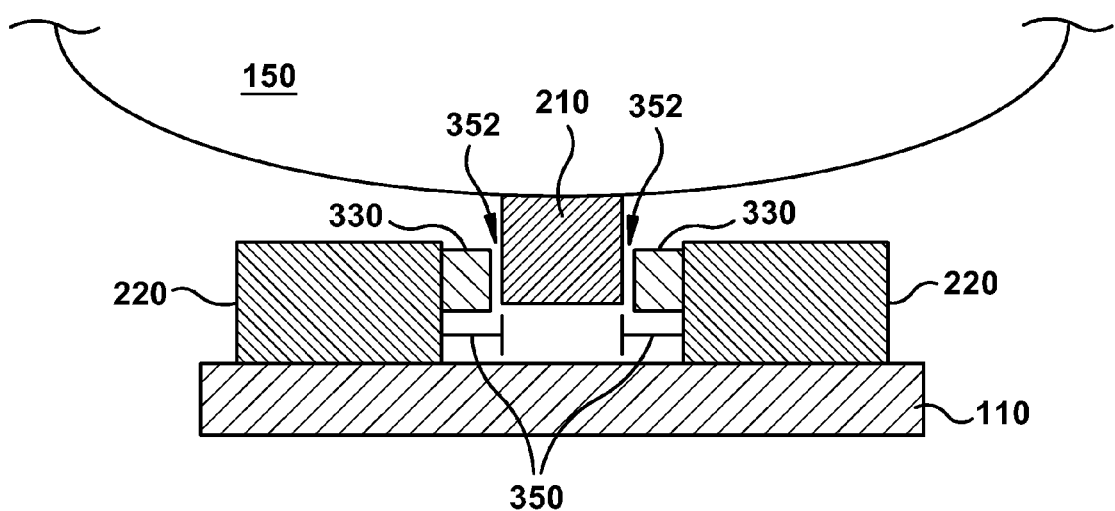
FIG. 3 illustrates an enlarged simplified view of the gib key, gib blocks and gib shim used to prevent or limit lateral or rotational movement of turbine casings.

FIG. 3 illustrates an enlarged simplified view of the gib key 210, gib blocks 220 and gib shim 330 used to prevent or limit lateral or rotational movement of the turbine casings while permitting axial and radial movement resulting from thermal expansion. In the past, a gib shim 330 was placed between the gib key 210 and gib blocks 220. Typically, this gib shim 330 has a solid piece of metal that was machined to obtain a desired gap. A distance between the gib blocks 220 and gib key 210 is indicated by 350. This distance 350 is larger than desired due to machine requirements, and a smaller gap 352 is needed. This gap is obtained by measuring length 350 and subtracting the desired gap, to obtain a width of gib shim 330. Once the width of gib shim 330 is known, then a trial and error process begins. A block of metal is obtained and machined, or ground/cut down to the approximate thickness. The shim 330 is installed, measured and invariably machined multiple times until the desired gap 352 is obtained. Once the proper gap is obtained, then the shim 330 is welded into place. While this older process works, it is very time consuming and labor intensive. It also makes changing the gap very difficult, as the old shims 330 must be removed and depending on the gap change, new shims installed or old shims reworked.

Figure 4:
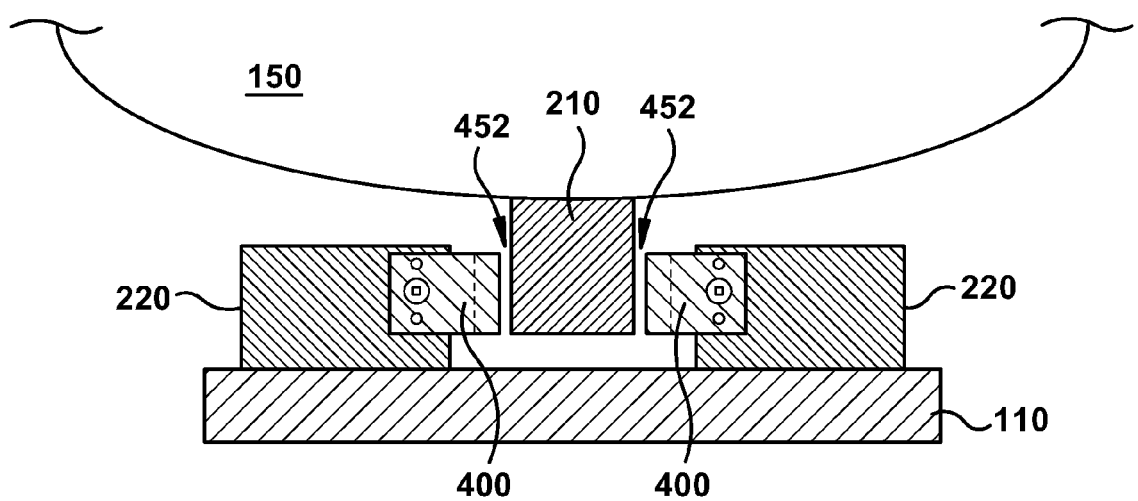
FIG. 4 illustrates an enlarged simplified view of the gib area incorporating an adjustable gib shim, according to an aspect of the present invention.

FIG. 4 illustrates an enlarged simplified view of the gib area incorporating an adjustable gib shim 400, according to an aspect of the present invention. The adjustable gib shim 400 (which may also be referred to as an article of manufacture) can be attached to the gib block 220 (as shown) or to the gib key 210 (not shown). The adjustable gib shim 400 allows the gap 452 to be easily adjusted and re-adjusted, without any complex and time consuming machining.

Figure 5:
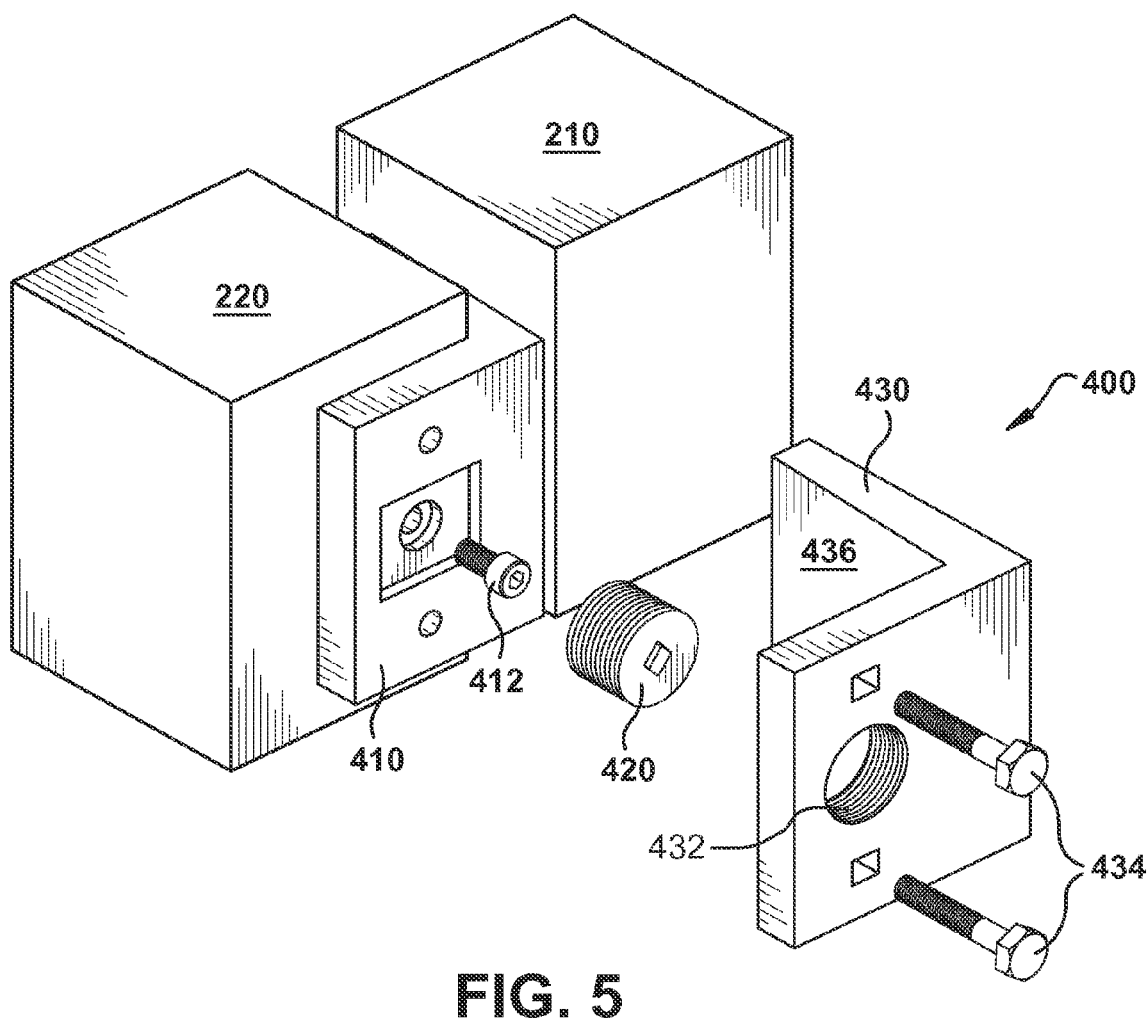
FIG. 5 illustrates an exploded view of the adjustable gib shim, according to an aspect of the present invention.

FIG. 5 illustrates an exploded view of the adjustable gib shim 400, according to an aspect of the present invention. The adjustable gib shim 400 includes a first member 410 configured to be attached to a first support structure (e.g., gib block 220 or gib key 210). In the embodiment shown, the first member 410 is attached to the gib block 220 by a first fastener 412 (e.g., a bolt or screw). The gib block 220 would contain a threaded hole sized for the external threads on fastener 412. Expanding type fasteners could also be used, or a threaded rod could project from the gib block 220 and the first member could be secured with a nut. An externally threaded dowel 420 threads into a threaded hole 432 in a second member 430. This externally threaded dowel is used to move the second member 430 relative to the first member 410, as will be described hereinafter. Once the desired gap is obtained, by rotating the dowel 420, two second fasteners 434 are used to lock the gib shim 400. The fasteners 434 pass through the second member 430 and go into (or through) the first member and may continue on into threaded holes in gib block 220. The second member includes a tapered surface 436 designed to cooperate with a tapered surface 416 on the first member.

Figure 6:
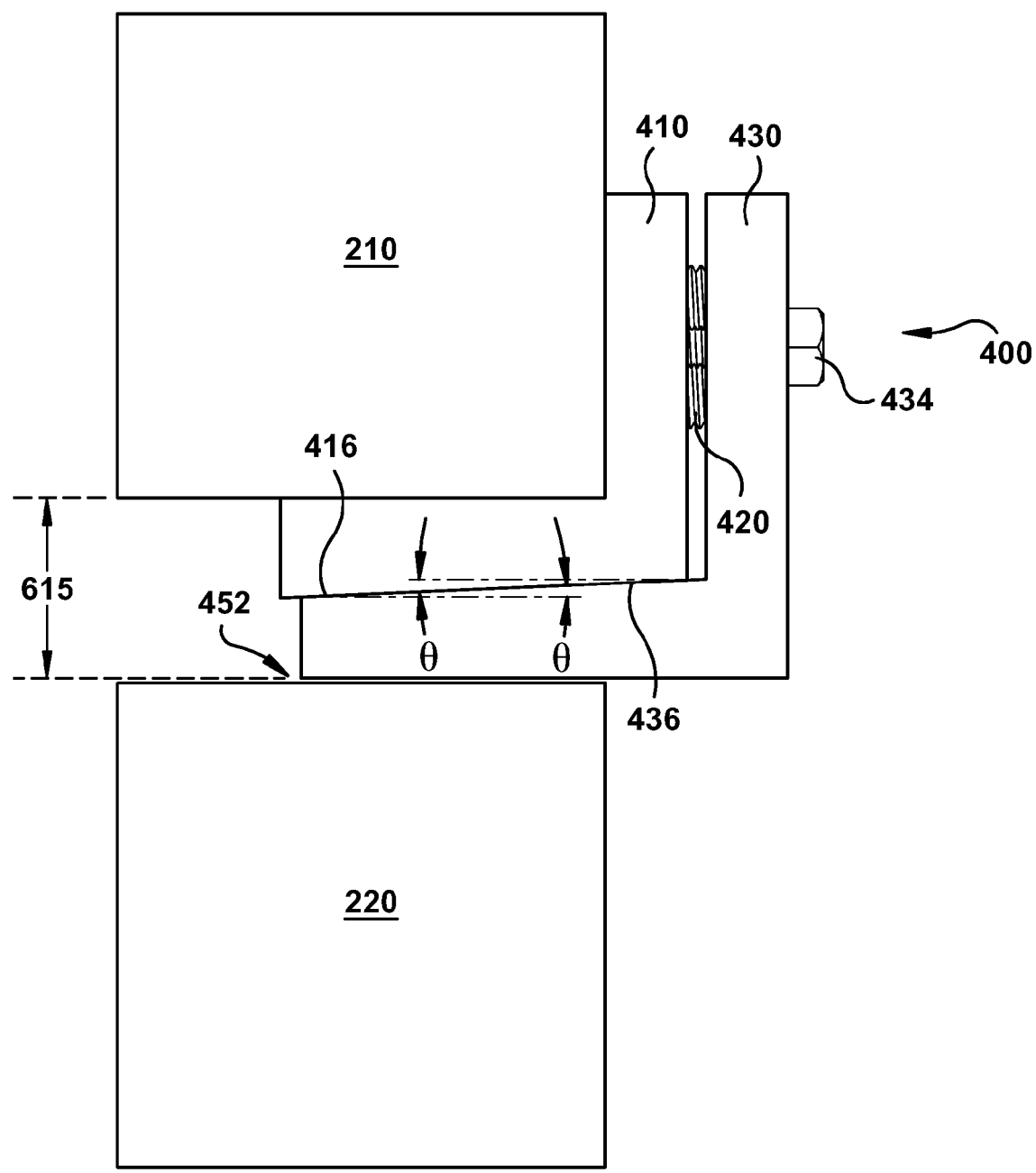
FIG. 6 illustrates a plan view of an assembled adjustable gib shim attached to the gib key.

FIG. 6 illustrates a plan view of an assembled adjustable gib shim 400 attached to the gib key 210. The first member 410 is attached to the gib key 210 by means of fastener 412 (not shown). The first member also includes a tapered surface 416, and the tapered surface may be tapered at an angle θ between about 1 degree to about 15 degrees (from a horizontal line with respect to FIG. 6). The second member 430 also includes a tapered surface 436 that is also tapered at an angle θ between about 1 degree to about 15 degrees. Both surfaces 416 and 436 may have the same angle of taper to maintain parallel opposing surfaces (e.g., the opposing surface of first member 410 in contact with gib key 210 and the opposing surface of second member 430 facing gap 452). The gap 452 can be adjusted or 'fine-tuned" by rotation of dowel 420. As dowel 420 is rotated, second member moves closer to or farther away from first member 410, and the distance spanned 615 will also increase or decrease respectively. For example, if the gap 452 is smaller than desired, then the second member 430 can be moved away (or to the right) from the first member 410, thereby decreasing the distance spanned and increasing the gap 452. Conversely, if the gap 452 is greater than desired, then the second member 430 can be moved towards (or to the left) the first member 410, thereby increasing the distance spanned and decreasing the gap 452. In other words, the distance spanned 615 and gap 452 can be adjusted by the relative sliding movement between the tapered surface 416 of the first member 410 and the tapered surface 436 of the second member 430.

The gap 452 can be designed for any desired length. As non-limiting examples only, the gap can be zero to forty mils or more, zero to twenty mils or more, or any desired range or value. In some applications no gap is desired, so the second member 430 could be moved towards the first member 410 until the second member 430 makes contact with the opposing surface (e.g., gib block 220 in FIG. 6). As stated previously, to obtain relative sliding movement between the two tapered surfaces 416, 436, one only needs to rotate the externally threaded dowel 420. The dowel 420 may include a recess or projection for a tool to aid rotation. For example, the dowel 420 may include a square recess for a square shaped tool head.

The adjustable gib shim 400 could be applied to gas turbines, steam turbines, engines or any turbomachine. The shim 400 could be used at any location where an adjustable gap is required or desired. The shim 400 could also be used between the inner and outer shells/casings of a turbine. The shim 400 could also be used in dynamoelectric machines (e.g., engines, motors or generators) or in any application where an adjustable gap is desired.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An article of manufacture comprising:
a first member configured to be attached to a gib block;
a second member configured to be attached to the first member;
an externally threaded dowel configured to engage an internally threaded hole in the second member, the externally threaded dowel also configured to contact the first member;
wherein, rotation of the externally threaded dowel adjusts a distance spanned by the first member and the second member, the distance forming a gap between the second member and a gib key and adjustment of the externally threaded dowel enables a desired gap to be obtained between the second member and the gib key.

2. The article of manufacture of claim 1, wherein the first member comprises a tapered surface and the second member comprises a tapered surface, the tapered surface of the first member configured to mate with the tapered surface of the second member, and the distance spanned is adjusted by relative sliding movement between the tapered surface of the first member and the tapered surface of the second member.

3. The article of manufacture of claim 2, wherein both the tapered surface of the first member and the tapered surface of the second member are tapered at an angle of about 1 degree to about 15 degrees.

4. The article of manufacture of claim 1, further comprising a first fastener configured to pass through the first member to attach the first member to the gib block.

5. The article of manufacture of claim 1, further comprising at least one second fastener configured to pass through the second member and at least part of the first member to lock the second member to the first member and to lock the distance spanned.

6. The article of manufacture of claim 1, wherein the article of manufacture is configured for use with a turbomachine.

7. The article of manufacture of claim 6, the gap being greater than or equal to 0 mils.

8. An article of manufacture configured for use with a turbomachine comprising:
a first member configured to be attached to a gib key, the first member comprising a first tapered surface;
a second member configured to be attached to the first member, the second member comprising a second tapered surface;
an externally threaded dowel configured to engage an internally threaded hole in the second member, the externally threaded dowel also configured to contact the first member;
wherein, the first tapered surface is configured to cooperate with the second tapered surface, and rotation of the externally threaded dowel causes relative sliding movement between the first tapered surface and the second tapered surface to thereby adjust a gap between the second member and a gib block, the gib key mounted to the turbomachine, and adjustment of the externally threaded dowel enables a desired gap to be obtained.

9. The article of manufacture of claim 8, wherein both the first tapered surface and the second tapered surface are tapered at an angle of about 1 degree to about 15 degrees.

10. The article of manufacture of claim 8, further comprising a first fastener configured to pass through the first member to attach the first member to the gib key.

11. The article of manufacture of claim 8, further comprising at least one second fastener configured to pass through the second member and at least part of the first member to lock the second member to the first member.

12. The article of manufacture of claim 8, wherein the turbomachine is a gas turbine or a steam turbine.

13. The article of manufacture of claim 8, wherein the gap between the second member and the gib block is greater than or equal to 0 mils.

14. A gib shim configured for use with a turbomachine, the turbomachine being a gas turbine or a steam turbine, the gib shim comprising:
a first member configured to be attached to a first structure, the first member comprising a first tapered surface;
a second member configured to be attached to the first member, the second member comprising a second tapered surface;
an externally threaded dowel configured to engage an internally threaded hole in the second member, the externally threaded dowel also configured to contact the first member;
wherein, the first tapered surface is configured to cooperate with the second tapered surface, and rotation of the externally threaded dowel causes relative sliding movement between the first tapered surface and the second tapered surface to thereby adjust a gap between the second member and a second structure, the second structure is a turbomachine part mounted to the turbomachine.

15. The gib shim of claim 14, wherein both the first tapered surface and the second tapered surface are tapered at an angle of about 1 degree to about 15 degrees.

16. The gib shim of claim 15, further comprising a first fastener configured to pass through the first member to attach the first member to the first structure.

17. The gib shim of claim 16, further comprising at least one second fastener configured to pass through the second member and at least part of the first member to lock the second member to the first member.

18. The gib shim of claim 17, wherein the gap between the second member and the second structure is greater than or equal to 0 mils.

19. The gib shim of claim 14, wherein the second structure is a gib key.

* * * * *